United States Patent Office 3,525,985
Patented Aug. 25, 1970

3,525,985
DATA HANDLING ARRANGEMENTS
Peter M. Melliar-Smith, London, England, assignor to English Electric Computers Limited, London, England, a British company
Filed May 2, 1968, Ser. No. 726,136
Claims priority, application Great Britain, May 4, 1967, 20,675/67
Int. Cl. G06f 7/00
U.S. Cl. 340—172.5        3 Claims

ABSTRACT OF THE DISCLOSURE

A data storage arrangement includes a slow store, a fast store and a control unit. When data is required which is contained in one of the stores the control unit first searches the fast store for the data and if the data is not found in the fast store it searches the slow store and when it finds the data transfers it to the fast store where it is read out. The data which is stored in the fast store is the data which is most in demand.

The invention relates to data storage arrangements, particularly for digital computers.

According to the invention, a data storage arrangement comprises first, relatively slow, storage means, second, relatively fast, storage means, output means operative to search the second storage means for a requested item of data and to obtain it therefrom when found therein and operative in response to absence of the requested item of data in the second storage means to search the first storage means for the requested item of data and to obtain it therefrom, scanning means operative to serially monitor the data in the fast store whereby to select the first data monitored in the series which has not been obtained by the output means since it was last monitored, and control means operative in response to the obtaining of the said requested item of data from the first storage means to insert the requested item of data into the second storage means in place of the said selected data.

The said series may be predetermined or random.

Advantageously, the first storage means has a plurality of storage locations each for storing an item of data and its address and the second storage means has a plurality of storage locations each for storing a plurality of items of data also stored in the first storage means and the address of one of them, the output means including searching means for searching the second storage means to locate a said storage location thereof containing the requested item of data, read-out means operative in response to location of such a storage location to read out all the items of data therefrom, and selecting means operative to select the said requested item of data from all the items of data read out.

In a particular embodiment of the invention, the scanning means includes means for serially scanning each of the storage locations of the second storage means, and means for selecting the first storage location scanned from which all the items of data have not been read out by the read-out means since the location was last scanned, the said control means being operative in response to the obtaining of the said requested item of data from the first storage means to insert the said requested item of data into the selected storage location in the second storage means together with other items of data from the first storage means to replace the items of data in the said selected storage location, the address of one of the inserted items of data also being inserted into the storage location.

Preferably, the said inserted items of data are items having sequential addresses.

According to the invention, there is further provided a data storage arrangement, comprising first storage means having a relatively long access time and a relatively large number of storage locations, second storage means having a relatively short access time and a relatively small number of storage locations, output means operative to obtain requested data from the second storage means if present therein and to obtain the requested data from the first storage means if not in the second storage means, a plurality of indicator means each associated with a respective storage location in the second storage means and each arranged to be switched from a first state to a second state when the said requested data is obtained by the output means from the associated storage location, scanning means operative to separately inspect the states of the indicator means whereby to select the first indicator means inspected which is in the first state and operative to switch each indicator circuit inspected which is in the second state into the first state, and control means operative in response to the obtaining of the said requested data from the first storage means by the output means to enter the requested data into the storage location associated with the selected indicator means in place of the data stored therein.

The scanning means may be arranged to inspect the indicator means sequentially in a particular order. Instead, it may be arranged to inspect the indicator means randomly.

In a particular embodiment, the scanning means is arranged to inspect the indicator means sequentially in a particular order when activated, the first indicator means inspected when the scanning means is activated being the indicator means next following in the said order after the indicator means selected during the preivous inspection.

Advantageously, the data storage arrangement includes means for modifying data in the second storage means, each said indicating means including additional means arranged to be set into a particular state when the data in the associated storage location is modified, and the said control means being operative in response to the said additional means of the said selected indicator means being in the said particular state to enter the modified data in the associated storage location into the first storage means.

These and other novel features of the invention will be apparent from the following description, by way of example, of a data storage arrangement embodying the invention, reference being made to the accompanying drawing in which.

FIGURE 1

The data storage arrangement (FIG. 1) comprises a fast access store 10 and a slower access store 12. The slow store 12 may be a magnetic core store and the fast store 10 may be a store constructed from integrated circuits.

Figure 1:
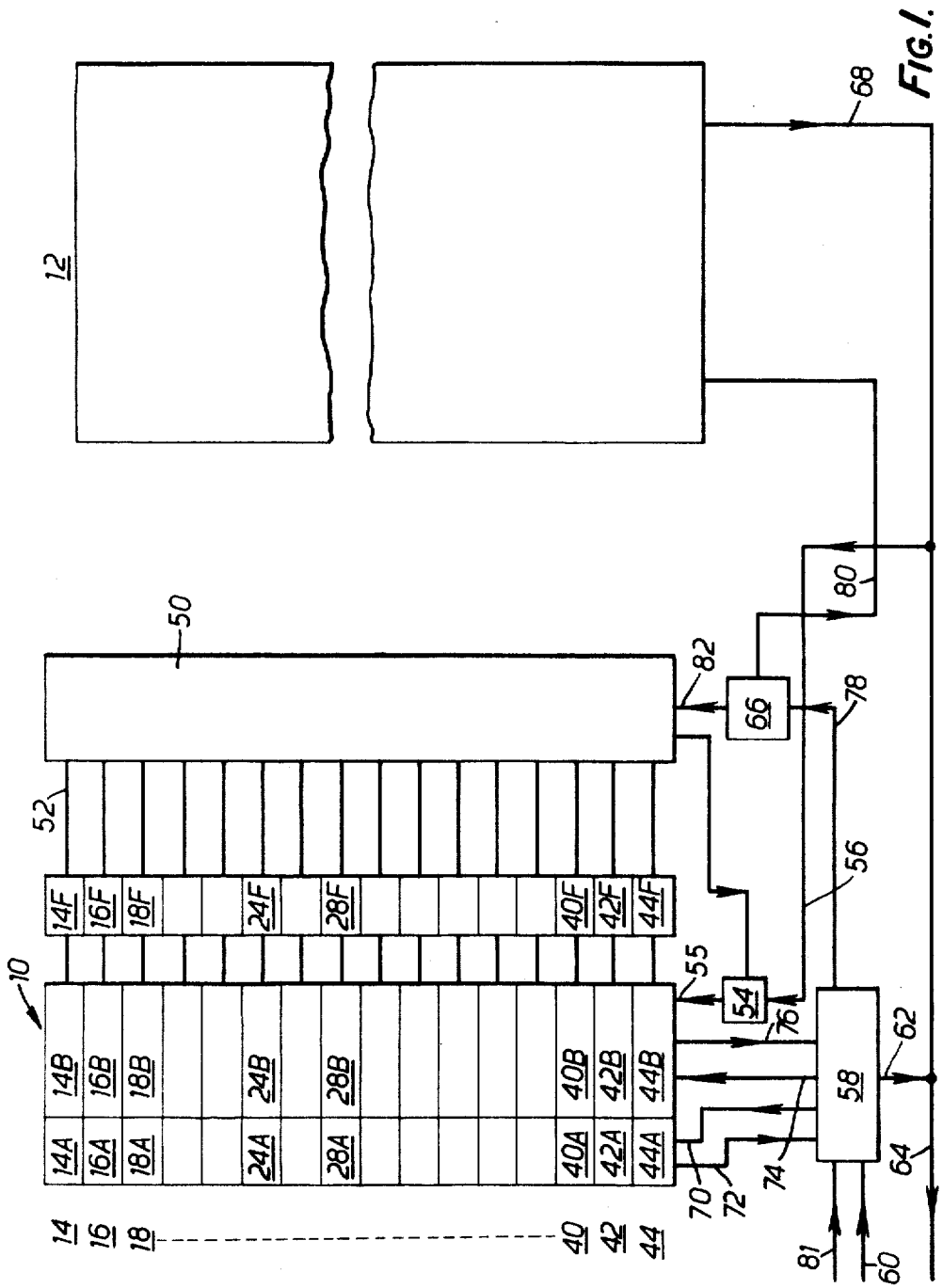
FIG. 1 is a block diagram schematically illustrating the storage arrangement.

The fast store 10 may have a capacity of 1,000 storage locations, each location being capable of storing one item of data, such as one data "word," for example, each word being made up of a plurality of binary bits. The store 12 has a very much larger number of storage locations. In FIG. 1, only sixteen storage locations 14 to 44 are illustrated in the fast store 10. Each storage location comprises one of a plurality of address portions 14A to 44A and one of a plurality of data portions 14B to 44B. The data stored in each of the data portions 14B to 44B corresponds to the data stored in a particular one of the storage locations in the slow store 12, and the address in the corresponding one of the address portions 14A to 44A is the address of the corresponding location in the store 12. In a manner to be described in detail below, the fast store 10 is arranged to store the data which is most frequently required by the computer. When data is required, the fast store is searched first for the data. If the data is present in the fast store, it is withdrawn therefrom (non-destructively) and the slow store 12 is not involved in the retrieval process. If the data is not present in the fast store, then it is obtained from the slow store (non-destructively) and at the same time entered into the fast store in place of a particular item of data therein which is removed.

Each location in the fast store 10 has an indicator circuit 14F to 44F associated with it. Each indicator circuit can be set into either one of two states, "0" or "1." Each indicator circuit is set into the "1" state when the data in the associated storage location is non-destructively withdrawn for use by the computer. A scanning and selecting unit 50 is associated with the indicator circuits 14F to 44F and is connected thereto by lines 52 by means of which the states of the indicator circuits can be sequentially inspected and by means of which, also, they can be switched from the "1" state to the "0" state. The scanning and selecting unit 50 is also connected to a gating arrangement 54 and, by means of this arrangement and a line 55, the unit 50 can feed into a selected storage location 14A to 44A the data received from the slow store 12 on a line 56; when data is fed into a location in the fast store 10 in this way, it overwrites the data already in the location.

Requirements for data by the computer are fed into a control unit 58 on a line 60. The main control unit 58 searches the fast store 10 for the data required and, if it is available in the fast store 10, retrieves the data and passes it to the computer on lines 62 and 64. If the data required is not in the fast store 10, then a selecting control unit 66 is activated and causes the data to be retrieved from the slow store 12 and fed to the computer on line 64 by means of a line 68. At the same time, the control unit 66 activates the scanning and selecting unit 50 to feed this data into a selected location in the fast store 10. While the circuitry comprising main control unit 58 is not disclosed, the same is known in the prior art. For example U.S. Pat. 3,231,868 (FIG. 5) discloses in detail an "address comparator" circuit which also searches a fast store in response to a request for particular data. Also, while selecting control 66 is not disclosed in detail an example of such unit may be found in FIG. 3c of U.S. Pat. 3,275,-991 wherein circuitry for reading data out of a slow store into a fast store, when the data is not found in the fast store, is disclosed.

The operation of the arrangement will now be described in more detail. It will first be assumed that the particular item of data required by the computer and requested on the line 60 is in fact stored in the storage location 24 of the fast store 10. When the request for data is received, the address of the requested data is compared by the control unit 58, by means of lines 70 and 72, with the addresses stored in all the address portions 14A to 44A in the fast store 10. The control unit 58 therefore detects that the address portion 24A contains the address of the required data and, by means of lines 74 and 76, the control unit 58 obtains the data from the data portion 24B and feeds it on lines 62 and 64 to the computer. The control unit 66 and the scanning and selecting unit 50 are not activated, but the indicating circuit 24F is switched into the "1" state when the data is read out (non-destructively) from the data portion 24B.

This type of operation is repeated each time the data requested by the computer on the line 60 is to be found in the fast store 10. The first retrieval of data from a data portion 14B to 44B causes the appropdiate indicator circuit 14F to 44F to be set into the "1" state; further retrievals from the same data portion 14B to 44B do not affect the indicator circuit thereof which remains in the "1" state.

It will now be assumed that the computer requests data which is not in fact to be found in the fast store 10. It will also be assumed that the previous data retrievals are such that the indicator circuits 14F to 26F are all in the "1" state, the indicator circuit 28F being in the "0" state indicating that data has not been obtained from the data portion 28B since the last scanning process. The request for data causes the control unit 58 to scan the address portions 14A to 44A as before. As the required data is not present in the fast store 10, this scan will result in a negative answer. The control unit 58 then passes the address of the required data to the control unit 66 by means of a line 78. The control unit 66 then, by means of a line 80, causes the required data to be fed from the appropriate location in the slow store 12 and passed to the computer by means of lines 68 to 64. The data fed from the slow store 12 is also passed to the gating arrangement 54 by means of line 56 and the unit 50 is activated by the control unit 66 by means of a signal on line 82.

The unit 50 then sequentially scans the indicator circuits 14F to 44F (in that order) by means of the lines 52. The unit 50 stops this scanning process at the first indicator circuit scanned which is in the "0" state. In this example, this is the indicator circuit 28F. The unit 50 then causes the gating arrangement 54 to feed into the storage location (the location 28, in this example) corresponding to this indicator circuit the data (and address thereof) coming in on the line 56 and this overwrites, and thus destroys, the data and address previously in this location.

Each indicator circuit scanned in automatically reset into the "0" state by the unit 50.

When a further item of data requested by the computer is not in fact present in the fast store 10, this type of operation is repeated. As before, the required data is obtained from the slow store 12 and the unit 50 is caused to scan the indicator circuits 14F to 44F to find the first indicator circuit in the "0" state; this scanning process starts from the indicator circuit reached at the end of the previous scan. As before, the data retrieved from the slow store 12 is fed into that data portion in the fast store 10 corresponding with the first indicator circuit detected by the unit 50 to be in the "0" state.

The data storage arrangement may include means enabling data in a particular storage location in the fast store 10, to modified in value. For this purpose, an appropriate signal together with the address and modified value of the data to be modified is fed into the control unit 58 on a line 81. Thereupon, the control unit 58 searches for the address, by means of the lines 70 and 72, and, if the address is found, the value of the data associated therewith is modified as desired by means of lines 74 and 76.

When an item of data is modified in this way, the appropriate indicator circuit 14F to 44F is set into the "1" state, the data modification thus being treated as a data retrieval for the purposes of the scanning and selecting unit 50. Each indicator circuit 14F to 44F also includes a separate indicator arranged to be set into a "1" state only when the data in the associated storage located has been modified, this separate indicator not being affected by data retrieval.

When the scanning and selecting unit 50 has scanned the indicator circuits in the manner described earlier and selected the particular appropriate storage location 14F to 44F in which to enter the data fetched from slow store 12, the indicator circuit thereof is additionally checked to detect whether the data in the associated storage location has been modified. If the unit 50 detects that the data in the storage location has been modified, then, before it is overwritten by the new data, the modification data is fed back into the slow store 12 and its modified value recorded there.

FIGURE 2

Description

A particular storage location (location 16) of the fast store 10, the associated indicator circuit 16F, the associated portion of the scanning and selecting unit 50, and the associated control circuitry, will now be described in greater detail with reference to FIG. 2.

The storage location 16 comprises the address portion 16A and the data portion 16B, each of which is in the form of a register. Data is fed into the data portion 16B from the slow store 12 (not shown in FIG. 2) by means of a data channel 100 under control of an AND gate 102. The address of the data is fed into the adddess portion 16A by means of an address channel 104 which is controlled by an AND gate 106. The data and address are fed out of the data and address portions by means of output channels 108 and 110 respectively, which are controlled by AND gates 112 and 114. Each output channel 108, 110 has two branches leading respectively to the computer and back to the store 12.

The indicator circuit 16F comprises two bistable stages 124 and 126. The bistable stage 124 is arranged to be switched into the "1" state when data is first read out of the storage location 16. The bistable stage 126 is arranged to be set into the "1" state when the data in the data portion 16B is modified in value (by means of the line 81, see FIG. 1).

The scanning and selecting unit 50 comprises a plurality of bistable stages connected in the manner of a ring counted and each corresponding to a particular storage location in the fast store. A bistable stage 129 corresponding to the storage location 16 is illustrated as is the bistable stage 130 which correspondings to the next storage location 18. Each bistable stage in the ring counter has an AND gate associated with it, two such AND gates 131 and 132 being shown. The operation of the ring counter is controlled by a further bistable stage 134. At any instant only one of the bistable stages of the ring counter is in the "1" state.

In a manner to be explained, a line 135 controls AND gates 102 and 112 (the latter by means of an inverter 136) and also a further AND gate 144 in the indicator circuit 16F. This line 135 carries a STORE input whenever data is to be written into the fast store 10 (that is, when data from the store 12 is to be entered into the store 10, or when data in the store 10 is to be modified by means of line 81—see FIG. 1) and at such times the output of inverter 136 is quiescent: at other times, the line 135 is quiescent and the inverter 136 produces a STORE signal.

Operation (1) The first mode of operation to be described is that which is effective when the data requested by the computer (on the line 60, see FIG. 1) is in fact stored in the data register 16B.

In response to the request for such data, the control unit 58 (FIG. 1) feeds the address of the requested data to all the address portions of the storage locations in the fast store 10 by means of an address channel 138, and in each address portion the address therein is compared in a known manner with the requested address. Since the address portion 16A is storing the requested address, an output will be produced on a line 139 which is passed to an AND gate 140. Line 135 is quiescent and therefore the AND gate 140 is receiving a $\overline{\text{STORE}}$ input from inverter 136. The AND gate 140 therefore opens and, by means of an OR gate 141, opens AND gate 112 allowing the data in the data portion 16B to be read out to the computer along the channel 108. At the same time, the line 139 causes a signal to be supplied to the bistable stage 124 on a line 142 setting this bistable stage into a "1" state indicating that the data in the data portion 16B has been used, and also causes a signal to be supplied to an AND gate 143 which remains closed because line 135 is quiescent. The line 142 is also connected to the bistable stage 126 through an AND gate 144, but this AND gate is controlled by the line 135 and is therefore shut preventing the signal on the line 142 from affecting the bistable stage 126 which thus remains in the "0" state.

None of the remaining circuitry is activated.

(2) The second mode of operation to be considered is that effective when the data requested by the computer on the line 60 (FIG. 1) is not in fact stored anywhere in the fast store 10 and has to be obtained from the slow store 12 and also (in the manner described in connection with FIG. 1) has to be entered into a selected location in the fast store.

Therefore, the address comparison carried out in the address portions 14A to 44A of the storage locations in the fast store 10 produces a negative result. The line 142 is, therefore, not energized and nor are any of the corresponding lines in the circuitry (not shown) associated with the other storage locations. Thus a gate 145 is activated to produce a NO WORD FOUND output on a line 146 which switches the bistable unit 134 into the "1" state. The bistable stage 134 energizes a control line 148 which supplies an output to AND gates 131 and 132 as well as to the other corresponding AND gates (not shown) controlling the ring counter in the unit 50. It will be assumed that the bistable unit 129 is in the "1" state, all the other bistable units in the ring counter being in the "0" state. The AND gate 131 therefore produces an output on a line 150 which is passed to two further AND gates 152 and 154 in the indicator circuit 16F. If the bistable unit 124 is in the "1" state, indicating that the data in the data portion 16B has been used since the last scanning process was carried out, then the AND gate 152 produces an output on a line 156 which, by means of an OR gate 158, produces a STEP signal on a line 160 switching the bistable unit 129 into the "0" state and the bistable unit 130 into the "1" state. The AND gate 132 therefore produces an output on a line not shown causing the state of the indicator circuit 18F to be checked and the circuitry illustrated is not operative any further. If, however, the bistable unit 124 is in the "0" state when the signal on the line 150 is produced, thus indicating that the data in the data portion 16B has not been used since the last scanning operation, then the AND gate 152 is not activated but the AND gate 154 produces an output on a line 159 which is fed to two further AND gates 161 and 162. The operation of these AND gates depends on the state of bistable stage 126, as is described below:

(a) Firstly, it will be assumed that the bistable stage 126 is in the "0" state, indicating that the data in the data portion 16B has not been modified. The AND gate 161 is therefore not activated but the AND gate 162 produces an output on lines 164 and 166. The output on the line 164 is passed through OR gate 158 to produce a STEP signal on the line 160 thus switching the bistable unit 129 into the "0" state and the bistable unit 130 into the "1" state. The output on the line 166 is passed through a further OR gate 168 to switch the bistable stage 134 into the "0" state thus stopping the scanning operation. At the same time, a signal is passed to AND gates 102 and 106 by means of lines 170 and 172 and OR gate 174. Therefore both AND gates 102 and 106 open allowing data and address from the store 12 to be fed into the storage location 16 by means of the channels 100 and 104 to overwrite the information therein. In this way, the data requested by the computer, and not found in the fast store 10, is written into the fast store in place of the data in the storage location 16.

(b) Secondly, it will be assumed that the bistable unit 126 is in the "1" state when line 158 is energized (thus indicating that the value of the data in data portion 16B has been modified). The AND gate 162 does not, therefore, immediately produce an output, but the AND date 161 energizes two lines 176 and 178. Energization of line 176 opens the AND gate 114 and, by means of OR gate 141, also opens AND gate 112. When the AND gates 112 and 114 open in this way, the data and address in the storage location 16 are passed back to the store 12 by means of the channels 108 and 110 and in this way the store 12 is made aware of the modification previously carried out to the data in the portion 16B. Energization of the line 178 causes the bistable stage 126 to be switched into the "0" state and therefore AND gate 162 now energizes lines 164 and 166. Line 164 generates a STEP signal on line 160 to set stage 129 into the "0" state and stage 130 into the "1" state, and line 166 opens AND gates 102 and 106. The new data and address is therefore fed into the storage location 16 from the slow store 12 by means of the channels 100 and 104. Scanning is stopped by the energization of the line 166 which switches bistable stage 134 into the "0" state.

(3) The third mode of operation to be considered is that which is effective when the value of the data in data portion 16B is to be modified.

On receipt of the appropriate signal on the line 81 (FIG. 1), the control unit 58 feeds the address of the address portion 16A into the address channel 138 whereupon it is compared with the address in each address portion. At the same time, the line 135 is energized to provide a STORE signal to AND gates 143 and 144, and the modified form of the data to be entered into the data portion 16B is placed on the channel 100.

The aforementioned address comparison will result in line 139 being energized to pass a signal by means of AND gate 143 and OR gate 174 to open the AND gate 102 thus allowing the modified form of the data to be entered into data portion 16B. The AND gate 112 remains closed since no $\overline{STORE}$ input is present at AND gate 140. At the same time, line 142 causes AND gate 144 to switch the bistable stage 126 into the "1" state to record the fact that the value of the data in data porton 16B has been changed.

Figure 2:
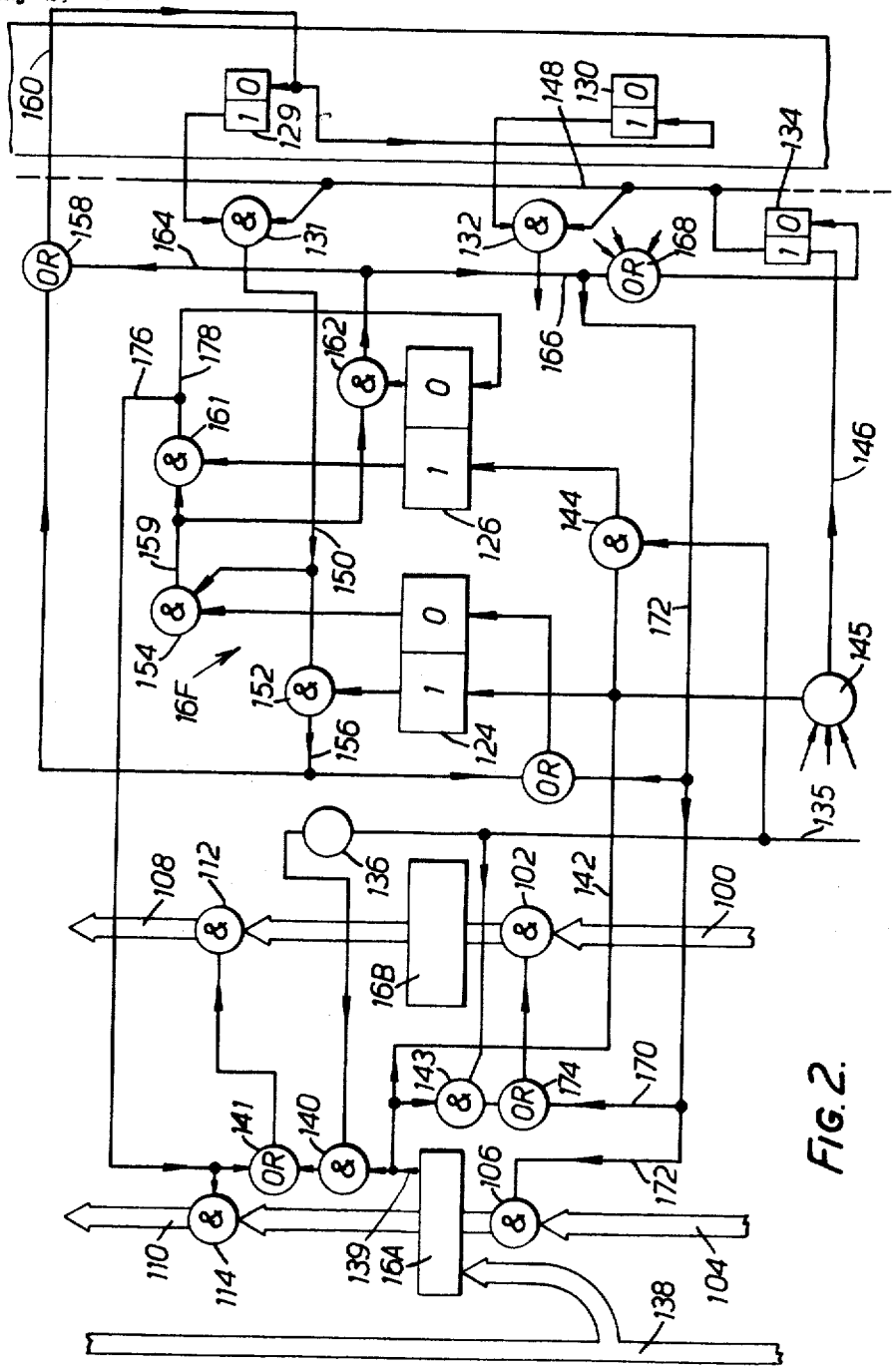
FIG. 2 is a block diagram of one storage location of the storage arrangement schematically illustrating its operation in more detail.

FIGURES 1 and 2

General

The arrangement described in FIGS. 1 and 2 ensures that most data requirementse are met by the fast store 10 and only infrequently is the slow store 12 involved. The overall speed of operation of the computer is therefore increased. In order to ensure that most data requests can be speedily met by the fast store, a first requirement is that the data in the fast store must be continuously updated by feeding into the fast store data which is likely to be required within a relatively short time; as the capacity of the fast store is limited, such data cannot be added to the fast store 10 without withdrawing some data already therein, and a second requirement, therefore, is that the data withdrawn from the fast store 10 should be the data which is not likely to be required for a relatively long time. In order to satisfy the first of these requirements, the arrangement described responds to each request for data not found in the fast store by entering this data into the fast store; it is found, in practice, that there is a strong likelihood that data once requested will be requested again within a relatively short time and thus this response of the arrangement is a practical and effective way of satisfying this first requirement. In order to satisfy the second requirement (that is, that the data withdrawn should be that which is not likely to be required for a relatively long time) the arrangement described inspects the items of data in the first store and withdraws the first item of data in the first storage and withdraws the first item of data inspected which is found not to have been used since the last inspection process was carried out: it is found, in practice, that past use of an item of data gives a guide as to its future use and thus the criterion used by the storage arrangement for selecting the item of data to be removed helps to meet the second requirement in a relatively simple and effective manner.

In a modification, the scanning and selecting unit 50 is arranged to scan the indicator circuits 14F to 44F, when activated, in a random fashion instead of sequentially as described.

In another modification, the scanning and selecting unit 50 is arranged to carry out the described scanning process (to select the item of data to be cancelled) *before* it is actually necessary to overwrite the data (that is, before the computer requests an item of data not found in the fast store). The actual overwriting of the data by the new data from the slow store 12 is carried out only when the data requested by the computer is not found in the fast store 10. This mode of operation increases the speed of operation of the computer since the scanning and selecting process carried out by the unit 50 can take place simultaneously with retrievals of data from the fast store 10.

FIGURE 3

Figure 3:
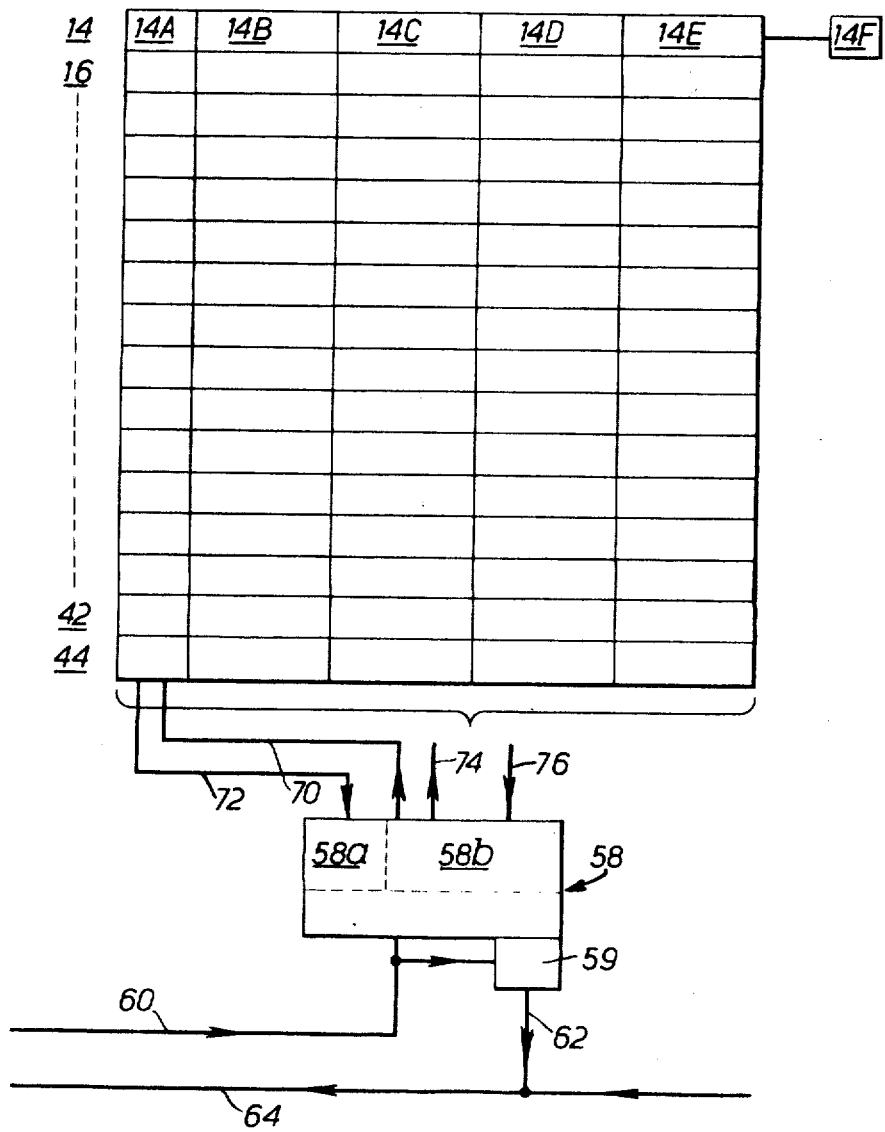
FIG. 3 is a block diagram schematically illustrating a modification of the storage arrangement.

A modification of the fast store 10 will now be described with reference to FIG. 3. FIG. 3 only illustrates the fast store 10, the indicator circuits 14F to 44F associated with the storage locations thereof, and the control unit 58; the remainder of the data storage arrangement is as shown in FIG. 1.

The fast store 10 of FIG. 3 differs from the store 10 of FIG. 1 in that each storage location has four data portions instead of the one data portion of each storage location in the store of FIG. 1. Thus, the storage location 14 has an address portion 14A and data portions 14B, 14C, 14D and 14E and the remaining storage locations 16 to 44 are similarly arranged. Each of the data portions in a storage location stores a separate data word and the address portion of each storage location contains only the address of the data in the first data portion of the location: that is, for example, the address in address portion 14A is the address of the data in data portion 14B. The addresses of the data stored in the remaining three data portions of each storage location are not recorded. They are in fact known, however, since the data in these three remaining portions is that originating from the next three locations in the store 12 to the location from which originated the data in the first data portion. Therefore, for example, the address of the data in the data portion 20C is known since it is the next address to the address recorded in the address portion 20A. In operation, data is always fed into all four data portions of each storage location of the store 10 simultaneously and is always read out from all four data portions simultaneously.

In operation, the control unit 58 responds to a request for data on the line 60 by a searching arrangement 58a of the unit 58 comparing the addresses in the address portions 14A to 44A with the address of the data requested. If this comparison indicates that one of the address portions 14A to 44A contains an address which is the same as that requested or contains an address which is one of the next three addresses to that requested, then the data in all of the four data portions in the appropriate storage location is read out by read out arrangement 58b of the unit 58 on the line 76 to the control unit 58.

The control unit 58 has an additional control section 59 which responds to the address of the data requested by selecting the appropriate one of the four data words fed out of the store 10 and feeds it to the computer on the lines 62 and 64. When the data is fed out of a storage location in the fast store 10 in this way, the appropriate indicator circuit 14F to 44F is set into the "1" state.

If the aforementioned address comparison by the control unit 58 indicates that the data requested is not stored in the fast store 10, then in a manner similar to that described in connection with FIG. 1, the data requested is fetched from the slow store 12. At the same time, the unit 50 scans through the indicator circuits to find the first circuit in the "0" state. The unit 50 then feeds into the particular storage location 14 to 44 corresponding with this indicator circuit the data (and its address) fetched from the slow store 12 together with the data from the next three storage locations therein.

This modification of the data storage arrangement considerably increases the capacity of the fast store 10 without increasing the number of address portions therein or the number of indicator circuits. It is found, in practice, that, when data is required from a particular location in the main store 12, there is a strong likelihood that data will also be required shortly from an adjacent storage location, and thus the modification, besides increasing the capacity of the fast store 10, helps to ensure that the fast store continues to store the most frequently required data.

It will be appreciated that the fast store of FIG. 3 can be modified to have a greater or lesser number of data portions than the four shown. The store 12 may be arranged in two or more sections each of which is arranged to supply the data to two, say, of the four data portions of each storage location in the store 10. In this way, data can be fed in parallel into the fast store 10 from the two sections of the slow store 12. In such an arrangement, the addresses of the storage locations in the different sections of the store 12 would be arranged so that two successive addresses were in one section of the store 12 and the next two successive addresses were in the next section of the store 12.

I claim:

1. A system for indicating usage and modification of data in data storage locations of a data store including a scanning means; and, for each data storage location, a bistable usage indicator having first and second stages, means to activate the first stage of the usage indicator in response to the usage of data in a corresponding storage location, modification indicator means for producing an indication of whether or not the data in said storage location has been modified, a first gate connected to the first stage of the usage indicator, a second gate connected to the second stage of the usage indicator, the output of the second gate being connected to said modification indicator means; said scanning means having individual scanning stages corresponding to each data storage location, a stage of the scanning means being connected to apply a scan signal to said first and second gates, said second gate passing a signal to said modification indicator means only if the second stage of said usage indicator has been activated.

2. A system as claimed in claim 1 in which the output of said first gate is connected to activate the second stage of said usage indicator and is connected to said scanning means.

3. A system as claimed in claim 2 in which the output of said first gate causes said scanning means to step to the next stage of said scanning means.

References Cited

UNITED STATES PATENTS

| | | | |
|---|---|---|---|
| 2,843,841 | 7/1958 | King et al. | 340—172.5 |
| 3,029,414 | 4/1962 | Schrimpf | 340—172.5 |
| 3,231,868 | 1/1966 | Bloom et al. | 340—172.5 |
| 3,251,041 | 5/1966 | Yaohan Chu | 340—172.5 |
| 3,275,991 | 9/1966 | Schneberger | 340—172.5 |
| 3,292,152 | 12/1966 | Barton | 340—172.5 |

OTHER REFERENCES

R. K. Richards—Arithmetic Operations in Digital Computers—February 1960, 201–208.

PAUL J. HENON, Primary Examiner

M. E. NUSBAUM, Assistant Examiner